June 11, 1946.     S. B. DINA     2,401,817
RELEASABLE FASTENING DEVICE
Filed Dec. 1, 1944
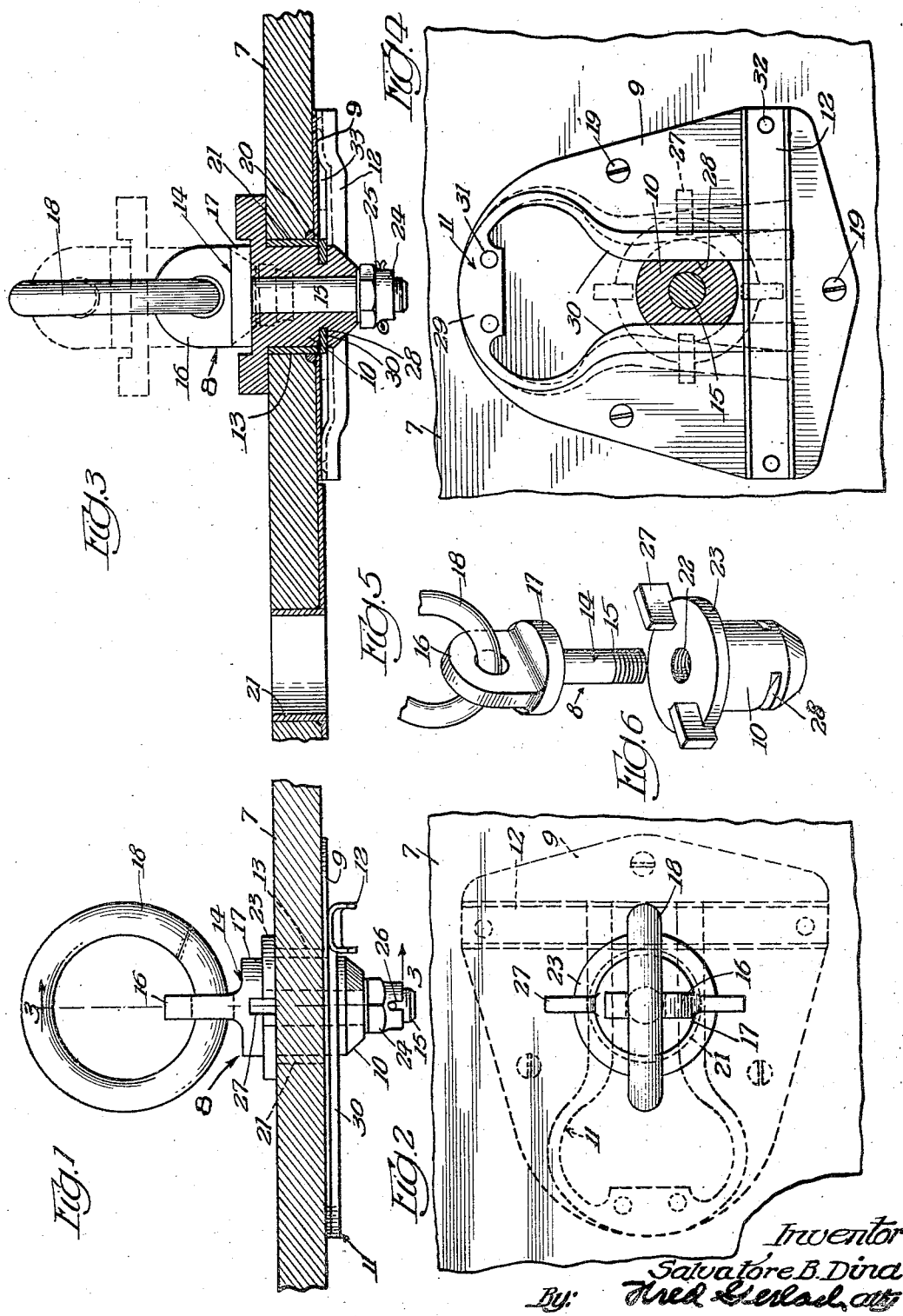
Inventor
Salvatore B. Dina
By: Fred Gerlach, atty Patented June 11, 1946

2,401,817

UNITED STATES PATENT OFFICE 2,401,817

RELEASABLE FASTENING DEVICE

Salvatore B. Dina, San Diego, Calif., assignor to Consolidated Vultee Aircraft Corporation, San Diego, Calif., a corporation of Delaware Application December 1, 1944, Serial No. 566,134

9 Claims. (Cl. 24—221)

The present invention relates generally to releasable fastening devices. More particularly the invention relates to that type of device which serves releasably to fasten an element to an apertured panel structure and as its principal components or parts comprises (1) a member which is rotatably mounted on the element and is shaped to fit within, and extend through, the aperture in the panel structure; and (2) a retaining part which is mounted adjacent the inner face of the panel structure and has a pair of laterally spaced resilient legs, portions of which extend normally across the inner end of the aperture and are adapted when the member is inserted fully into the aperture to snap into side notches in the inner end of the member and form with the notch defining portions interlocking connections for holding or locking the member in place and are further adapted when the member is rotated through an arc of approximately 90° so as to move the notches out of their interlocking position, to be cammed outwards by the inner end of the member into a so-called open position wherein the member and element are free to be removed from the panel structure.

One object of the invention is to provide a releasable fastening device of this type which is an improvement upon, and has certain advantages over, previously designed devices and is characterized by simplicity of design as well as facility of attachment and removal of the rotatably mounted member with respect to the leg equipped retaining part on the inner face of the apertured panel structure.

Another object of the invention is to provide a releasable fastening device of the type under consideration in which the retaining part is U-shaped and has the outer or distal ends of its legs free or disconnected and arranged so that the portions inwards of their outer end extremities extend normally across the inner end of the aperture in the panel structure.

Another object of the invention is to provide a releasable fastening device of the last mentioned character which comprises in addition to the element, rotatably mounted member and U-shaped retaining part simple and novel means for confining the legs of the U-shaped part so that they are only movable to and from one another in a plane at right angles to the axis of the aperture in the panel structure.

Another object of the invention is to provide a releasable fastening device of the type and character under consideration in which the rotatably mounted member embodies at its outer end an outwardly extending flange which serves to limit inward movement of the member into the aperture in the panel structure and embodies a plurality of ears whereby the member may be readily gripped in connection with turning or other manipulation thereof.

A further object of the invention is to provide a releasable fastening device which is designed and adapted for use in tying down cargo in an airplane or other vehicle and in which the element is in the form of an eye bolt, the eye of which has a ring for receiving a tie rope and the shank of which has the member rotatably mounted therearound.

A still further object of the invention is to provide a releasable fastening device which is generally of new and improved construction and may be manufactured at a low and reasonable cost.

Other objects of the invention and the various advantages and characteristics of the present releasable fastening device will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a side view showing a releasable fastening device embodying the invention in its operative or fully assembled position;

Figure 2 is a plan view;

Figure 3 is a longitudinal section taken on the line 3—3 of Figure 1 and illustrating in detail the manner in which the U-shaped retaining part operates to lock the rotatably mounted member in place in the aperture in the panel structure;

Figure 4 is a bottom view showing in detail the construction and design of the U-shaped retaining part and the means for confining the legs of the part so that they are only movable to and from one another in a plane at right angles to the aperture in the panel structure;

Figure 5 is a perspective of the eye bolt constituting the element to which the member is rotatably mounted; and Figure 6 is a perspective of the rotatably mounted member.

The releasable fastening device which is shown in the drawing constitutes the preferred form or embodiment of the invention. It is illustrated in connection with a panel structure 7 and comprises an element 8, an attaching plate 9, a member 10, a retaining part 11 and a channel bar 12. The panel structure 7 is illustrated in the drawing as being flooring although it may be a wall or any other panel-like structure. It is supported in spaced relation with a subjacent supporting structure (not shown) and embodies a vertically extending circular aperture 13 therethrough.

The element 8 in the embodiment of the invention herein disclosed is in the form of an eye bolt 14. The latter comprises a shank 15 and an eye 16 and together with the member 10 forms what may be termed or called a tying or hitching assembly. When the eye bolt is in its normal or inserted position the shank 15 extends vertically through the central portion of the aperture 13 in the panel structure 7. The eye 16 of the bolt is fixedly connected to the upper end of the shank 15 and has an integral circular flange 17 at its lower end. It also has a ring 18 to which a tie rope (not shown) may be attached. The ring is of the split variety and extends through the hole in the eye 16 of the eye bolt and has its ends welded or otherwise rigidly connected together. As shown in Figures 1 and 3, the shank 15 of the eye bolt is materially longer than the circular aperture 13 in the panel structure 7.

The attaching plate 9 is in the form of a plate or sheet metal stamping and fits flatly against the bottom face of the panel structure 7. It is secured in place by screws 19 and has in the central portion thereof a circular hole 20. The screws 19 extend through holes in the plate, and are arranged so that the shanks thereof extend into the panel structure 7. The circular hole 20 in the central portion of the plate 9 is in registry with, and the same in diameter as, the circular aperture 13 in the panel structure. A cylindrical bushing 21 fits snugly within the aperture 13 and has its lower end welded or otherwise fixedly secured to the portion of the attaching plate 9 that defines the centrally disposed circular hole 20. The upper end of the bushing 21 is flush with the top face of the panel structure 7.

The member 10 which with the eye bolt 14 constitutes a tying or hitching assembly, is for the most part cylindrical. It has a centrally disposed longitudinally extending bore 22 through which the shank 15 of the eye bolt 14 extends. The upper end of the member 10 is provided with an integral annular outwardly extending flange 23 and this underlies the circular flange 17 on the lower end of the eye 16 of the eye bolt 14. The member 10 is rotatable with respect to the eye bolt and is adapted to fit in, and extend through, the bushing 21 in the circular aperture 13 in the panel structure 7. It is substantially longer than the bushing and has its lower end tapered. A nut 24 on the lower end of the shank 15 of the eye bolt abuts against the tapered lower end of the member 10 and serves to hold the member against axial displacement with respect to the eye bolt. This nut is locked against rotation by way of a cotter pin 25 which extends through a transverse hole in the lower end of the shank of the eye bolt and a pair of diametrically opposite notches 26 in the nut. The annular outwardly extending flange 23 on the upper end of the rotatably mounted member 10 serves to limit downward displacement of the member with respect to the bushing 21 when the member is in its operative position wherein it extends through, and is rotatably mounted in, the bushing. In order to permit the member 10 to be readily gripped in connection with turning or other manipulation thereof ears 27 are provided. These ears are preferably two in number and are formed integrally with the outer peripheral portion of the annular outwardly extending flange 23. They are positioned one diametrically opposite the other and extend upwards and around the circular flange 17 on the lower end of the eye 16 of the eye bolt 14. The member 10 is provided directly above its tapered lower end with a pair of diametrically opposite notches 28. These notches are so positioned that when the member 10 is in place within the bushing 13, they are disposed directly beneath the lower end of the bushing, as shown in Figure 3. Preferably the notches 28 have straight inner surfaces and extend inwards approximately half way to the centrally disposed longitudinally extending bore 22. The ears 27 are preferably longitudinally aligned with the notches 28, as shown in Figure 6.

The retaining part 11 is U-shaped as best shown in Figure 4. It is in the form of a one-piece stamping of flat plate metal, directly underlies the attaching plate 9 and consists of a crosspiece 29 and a pair of laterally spaced legs 30. The crosspiece 29 is fixedly connected to the attaching plate 9 by rivets 31 and is spaced outwards from the circular hole 20 in the central portion of the plate. The legs 30 extend inwards from the crosspiece 29 and are arranged so that the portions thereof that are directly inwards of their outer end extremities are normally positioned across the lower end of the bushing 21. The inner ends of the legs are in the form of arcuate or outwardly bowed loops in order that the legs are resilient and hence permitted to flex or swing to and from one another. The portions of the legs that are directly inwards of the outer end extremities are adapted when the rotatably mounted member 10 is fully inserted into the bushing 21, to fit within the notches 28 in the member and form with the notch defining portions of the member interlocking connections for holding or locking the member in place. When the member 10 is inserted into the bushing while the notches 28 are positioned so that they face the locking portions of the legs 30 of the U-shaped retaining part 11 the tapered lower end of the member operates in connection with initial downward shift of the member into place to cam said locking portions of the legs outwards. After camming of the locking portions of the legs outwards by the lower tapered end of the member and in response to final downward shift of the member into place the legs, directly upon positioning of the notches 28 in registration therewith, swing inwards and result in their locking portions snapping into the notches and effecting the desired interlocking connections whereby the member 10 is held or locked in place. Should the member 10 be inserted into the bushing while positioned so that the notches 28 are at right angles to the locking portions of the legs 30 of the U-shaped retaining part 11, the lower tapered end of the member will spread the legs 30 so that they grip the portions of the member that extend between the ends of the notches. With the legs in their spread position it is then only necessary in order to effect locking of the member 10, to rotate the member 90° in order to cause the notches 28 to be brought into opposed relation with the locking portions of the legs. As soon as the member 10 is rotated in the aforementioned manner the legs 30 spring or flex inwards into a position wherein the locking portions thereof are in interfitting relation with the notches 28. When it is desired to remove the member 10 together with the ring equipped eye bolt 14 constituting the element 8 it is only necessary to rotate the member 10 throughout a 90° arc by applying rotative pressure or force to the ears 27. In connection with rotation of the member the notches 28 move out of interlocked relation with the locking portions of the legs and the portions of the member that are between the ends of the notches cam the legs 30 outwards into a so-called open position wherein the member and eye bolt are free to be removed from the panel structure by shifting them upwards relatively thereto.

The channel bar 12 extends transversely across and underlies the outer ends of the legs 30 of the U-shaped retaining part 11 and constitutes means for confining the legs so that they are only movable to and from one another in a plane at right angles to the axis of the aperture 13 in the panel structure 7. It is disposed in parallel relation with the crosspiece 29 of the retaining part and is arranged so that the side flanges thereof extend downwards. The ends of the bar fit flatly against the superjacent portions of the attaching plate 9 and are fixedly attached to the plate by way of rivets 32. The central portion of the channel bar, as best shown in Figure 3, is downwardly deflected so that it defines with the superjacent portion of the attaching plate 9, a longitudinal slideway 33 for the outer end extremities of the legs 30 of the U-shaped retaining part 11. The height of the slideway 33 is but slightly greater than the height of the legs 30 in order that the legs may flex freely to and from one another while at the same time they are effectively held against up and down movement, i. e., movement axially of the bushing 21.

The herein described releasable fastening device is simple in design and is characterized by the fact that the assembly of eye bolt and rotatably mounted member may be attached and removed with respect to the leg equipped retaining part with facility. It is light in weight and has many capabilities of use. One particular use is in connection with an airplane of the cargo carrying type. When it is desired to use the device together with like devices in connection with an airplane the flooring of the airplane is provided at closely spaced intervals with circular apertures and a bushing equipped attaching plate with a retaining part and a channel bar is associated with each of the apertures. When a piece of cargo is placed on the flooring a suitable number of tying or hitching assemblies are inserted into the flooring apertures in close proximity to the cargo piece and the piece is lashed in place by tie ropes which are attached or anchored to the rings on the eye bolts of the assemblies. In connection with airplane cargo lashing only as many assemblies are used as are necessary in order adequately to secure the cargo piece in place. The herein described releasable fastening device may also be used on a wall or in similar panel structures for any desired purposes.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a device adapted releasably to fasten an element to a panel structure with a circular aperture therethrough, and comprising a substantially cylindrical member connected to the element, embodying such shape as to fit rotatably within, and extend through, the aperture, having its inner end tapered for camming purposes, and provided adjacent its tapered end with a pair of diametrically opposite side notches, a U-shaped retaining part disposed adjacent and in parallel relation with the inner face of the panel, having the outer end extremities of its legs free or disconnected so that the legs are free to flex to and from one another, and having the portions of its legs immediately inwards of said outer end extremities positioned normally across the inner end of the aperture and adapted when the member is inserted into place in the aperture while the side notches thereof face said portions to snap into the side notches and effect interlocking connections therewith for holding the member in place and further adapted when the member is turned so as to position the side notches at right angles to said portions to be spread apart by the portions of the member between the ends of the notches into an open position wherein the member and element are free to be removed from the panel structure, and means on the inner face of the panel structure for confining the legs of the U-shaped part so that they are only movable to and from one another in a plane at right angles to the axis of the aperture.

2. As a new article of manufacture, a device adapted releasably to fasten an element to a panel structure with a circular aperture therethrough, and comprising a substantially cylindrical member connected to the element, embodying such shape as to fit rotatably within, and extend through, the aperture, having its inner end tapered for camming purposes, and provided adjacent its tapered end with a pair of diametrically opposite side notches, a U-shaped retaining part disposed adjacent and in parallel relation with the inner face of the panel, having the outer end extremities of its legs free or disconnected so that the legs are free to flex to and from one another, and having the portions of its legs immediately inwards of said outer end extremities positioned normally across the inner end of the aperture and adapted when the member is inserted into place in the aperture while the side notches thereof face said portions to snap into the side notches and effect interlocking connections therewith for holding the member in place and further adapted when the member is turned so as to position the side notches at right angles to said portions to be spread apart by the portions of the member between the ends of the notches into an open position wherein the member and element are free to be removed from the panel structure, and a bar disposed adjacent said inner face of the panel structure and having its ends fixedly anchored in place and its central portion offset away from the adjacent part of the structure extending transversely across said outer end extremities of the legs and defining with said adjacent part of the structure a rectangular slideway for confining the legs of the U-shaped part so that they are only movable to and from one another in a plane at right angles to the axis of the aperture.

3. As a new article of manufacture, a device adapted releasably to fasten an element to a panel structure with a circular aperture therethrough, and comprising a substantially cylindrical member connected to the element, embodying such shape as to fit rotatably within, and extend through, the aperture, having its inner end tapered for camming purposes, and provided adjacent its tapered end with a pair of diametrically opposite side notches, a U-shaped retaining part disposed adjacent and in parallel relation with the inner face of the panel, having the outer end extremities of its legs free or disconnected so that the legs are free to flex to and from one another, and having the portions of its legs immediately inwards of said outer end extremities positioned normally across the inner end of the aperture and adapted when the member is inserted into place in the aperture while the side notches thereof face said portions to snap into the side notches and effect interlocking connections therewith for holding the member in place and further adapted when the member is turned so as to position the side notches at right angles to said portions to be spread apart by the portions of the member between the ends of the notches into an open position wherein the member and element are free to be removed from the panel structure, and a channel bar positioned adjacent and so that the side flanges thereof project away from said inner face of the panel structure and having its ends fixedly anchored in place and its central portion offset away from the adjacent part of the structure extending transversely across said outer end extremities of the legs and defining with said adjacent part of the structure a rectangular slideway for confining the legs of the U-shaped part so that they are only movable to and from one another in a plane at right angles to the axis of the aperture.

4. As a new article of manufacture, a device adapted releasably to fasten an element to a panel structure with an aperture therethrough, and comprising a substantially cylindrical member connected to the element, embodying such shape as to fit rotatably within, and extend through, the aperture, having its inner end tapered for camming purposes, and provided at its tapered end with a pair of diametrically opposite side notches and at its outer end with an outwardly extending flange adapted to limit inward movement of the member into the aperture and embodying ears for member turning purposes, a U-shaped retaining part disposed adjacent and in parallel relation with the inner face of the panel, having the outer end extremities of its legs free or disconnected so that the legs are free to flex to and from one another, and having the portions of its legs immediately inwards of said outer end extremities positioned normally across the inner end of the aperture and adapted when the member is inserted into place in the aperture while the side notches thereof face said portions to snap into the side notches and effect interlocking connections therewith for holding the member in place and further adapted when the member is turned so as to position the side notches at right angles to said portions to be spread apart by the portions of the member between the ends of the notches into an open position wherein the member and element are free to be removed from the panel structure, and means on the inner face of the panel structure for confining the legs of the U-shaped part so that they are only movable to and from one another in a plane at right angles to the axis of the aperture.

5. As a new article of manufacture, a device adapted releasably to fasten an element to a panel structure with a circular aperture therethrough, and comprising an attaching plate secured to, and fitting flatly against, the inner face of the panel structure, having a circular opening in registry with the aperture and provided with a cylindrical bushing fitting within, and coextensive with, the aperture and having its inner end connected to the opening defining portion of the plate, a substantially cylindrical member connected to the element, embodying such shape as to fit rotatably within, and extend through, the bushing, having its inner end tapered for camming purposes and provided adjacent its tapered end with a pair of diametrically opposite side notches, a U-shaped retaining part disposed adjacent the exposed face of, and in parallel relation with, the attaching plate, having the crosspiece thereof fixedly connected to the plate and the outer end extremities of its legs free or disconnected so that the legs are free to flex to and from one another, and having the portions of its legs immediately inwards of said outer end extremities positioned normally across the inner end of the bushing and adapted when the member is inserted into place in the aperture while the side notches thereof face said portions to snap into the side notches and effect interlocking connections therewith for holding the member in place and further adapted when the member is turned so as to position the side notches at right angles to said portions to be spread apart by the portions of the member between the ends of the notches into an open position wherein the member and element are free to be removed from the panel structure, and means connected to said attaching plate for confining the legs of said U-shaped part so that they are only movable to and from one another.

6. As a new article of manufacture, a device adapted releasably to fasten an element to a panel structure with a circular aperture therethrough, and comprising an attaching plate secured to, and fitting flatly against, the inner face of the panel structure, having a circular opening in registry with the aperture and provided with a cylindrical bushing fitting within, and coextensive with, the aperture and having its inner end connected to the opening defining portion of the plate, a substantially cylindrical member connected to the element, embodying such shape as to fit rotatably within, and extend through, the bushing, having its inner end tapered for camming purposes and provided adjacent its tapered end with a pair of diametrically opposite side notches, a U-shaped retaining part disposed adjacent the exposed face of, and in parallel relation with, the attaching plate, having the crosspiece thereof fixedly connected to the plate and the outer end extremities of its legs free or disconnected so that the legs are free to flex to and from one another, and having the portions of its legs immediately inwards of said outer end extremities positioned normally across the inner end of the bushing and adapted when the member is inserted into place in the aperture while the side notches thereof face said portions to snap into the side notches and effect interlocking connections therewith for holding the member in place and further adapted when the member is turned so as to position the side notches at right angles to said portions to be spread apart by the portions of the member between the ends of the notches into an open position wherein the member and element are free to be removed from the panel structure, and a bar in parallel relation with the crosspiece of the U-shaped part and having the ends thereof fixedly connected to the attaching plate and its central portion offset away from the adjacent part of the plate extending across said outer end extremities of the legs and forming with said adjacent part of the attaching plate a rectilinear slideway for confining the legs of the U-shaped part so that they are only movable to and from one another in a plane at right angles to the axis of the bushing.

7. As a new article of manufacture, a device adapted releasably to fasten an element to a panel structure with a circular aperture therethrough, and comprising an attaching plate secured to, and fitting flatly against, the inner face of the panel structure, having a circular opening in registry with the aperture and provided with a cylindrical bushing fitting within, and coextensive with, the aperture and having its inner end connected to the opening defining portion of the plate, a substantially cylindrical member connected to the element, embodying such shape as to fit rotatably within, and extend through, the bushing, having its inner end tapered for camming purposes, and provided adjacent its tapered end with a pair of diametrically opposite side notches and at its outer end with an annular outwardly extending flange adapted to limit inward movement of the member into the bushing and embodying a pair of diametrically opposite ears for member turning purposes, a U-shaped retaining part disposed adjacent the exposed face of, and in parallel relation with, the attaching plate, having the crosspiece thereof fixedly connected to the plate and the outer end extremities of its legs free or disconnected so that the legs are free to flex to and from one another, and having the portions of its legs immediately inwards of said outer end extremities positioned normally across the inner end of the bushing and adapted when the member is inserted into place in the aperture while the side notches thereof in the aperture while the side notches thereof face said portions to snap into the side notches and effect interlocking connections therewith for holding the member in place and further adapted when the member is turned so as to position the side notches at right angles to said portions to be spread apart by the portions of the member between the ends of the notches into an open position wherein the member and element are free to be removed from the panel structure, and a bar in parallel relation with the crosspiece of the U-shaped part and having the ends thereof fixedly connected to the attaching plate and its central portion offset away from the adjacent part of the plate extending across said outer end extremities of the legs and forming with said adjacent part of the attaching plate a rectilinear slideway for confining the legs of the U-shaped part so that they are only movable to and from one another in a plane at right angles to the axis of the bushing.

8. As a new article of manufacture, a releasable fastening device adapted for use in connection with a panel structure with a circular aperture therethrough, and comprising an element having a shank at one end thereof, a substantially cylindrical member rotatably mounted on the shank and confined against axial displacement relatively thereof, embodying such shape as to fit rotatably within and extend through the aperture, having its inner end tapered for camming purposes, and provided adjacent its tapered end with a pair of diametrically opposite side notches, a U-shaped retaining part disposed adjacent and in parallel relation with the inner face of the panel, having the outer end extremities of its legs free or disconnected so that the legs are free to flex to and from one another, and having the portions of its legs immediately inwards of said outer end extremities positioned normally across the inner end of the aperture and adapted when the member is inserted into place in the aperture while the side notches thereof face said portions to snap into the side notches and effect interlocking connections therewith for holding the member in place and further adapted when the member is turned so as to position the side notches at right angles to said portions to be spread apart by the portions of the member between the ends of the notches into an open position wherein the member and element are free to be removed from the panel structure, and means on the inner face of the panel structure for confining the legs of the U-shaped part so that they are only movable to and from one another in a plane at right angles to the axis of the aperture.

9. As a new article of manufacture, a releasable fastening device adapted for use in connection with a panel structure with a circular aperture therethrough, and comprising an eye bolt having attaching means applied to the eye thereof, a substantially cylindrical member mounted rotatably on the shank of the eye bolt and confined against axial displacement relatively thereto, embodying such shape as to fit rotatably within, and extend through, the aperture having its inner end tapered for camming purposes, and provided adjacent its tapered end with a pair of diametrically opposite side notches, a U-shaped retaining part disposed adjacent and in parallel relation with the inner face of the panel, having the outer end extremities of its legs free or disconnected so that the legs are free to flex to and from one another, and having the portions of its legs immediately inwards of said outer end extremities positioned normally across the inner end of the aperture and adapted when the member is inserted into place in the aperture while the side notches thereof face said portions to snap into the side notches and effect interlocking connections therewith for holding the member in place and further adapted when the member is turned so as to position the side notches at right angles to said portions to be spread apart by the portions of the member between the ends of the notches into an open position wherein the member and element are free to be removed from the panel structure, and means on the inner face of the panel structure for confining the legs of the U-shaped part so that they are only movable to and from one another in a plane at right angles to the axis of the aperture.

SALVATORE B. DINA.